United States Patent [19]

Waterhouse et al.

[11] Patent Number: 5,245,534
[45] Date of Patent: Sep. 14, 1993

[54] ELECTRONIC TAG LOCATION SYSTEMS

[75] Inventors: Paul Waterhouse, Copetown; John Stevens, Mississauga, both of Canada

[73] Assignee: ERS Associates Limited Partnership, Wilton, Conn.

[21] Appl. No.: 757,260

[22] Filed: Sep. 10, 1991

[51] Int. Cl.$^5$ .......................... G07G 1/12; G06F 7/04; G06K 15/00

[52] U.S. Cl. .................................. 364/404; 235/383; 340/825.35

[58] Field of Search ....................... 364/404, 464, 465; 235/383; 340/152, 172.5, 825.35

[56] References Cited

U.S. PATENT DOCUMENTS 4,372,464 2/1983 Otten ............................. 221/14

Primary Examiner—Roy N. Envall, Jr.
Assistant Examiner—Khai Tran
Attorney, Agent, or Firm—Brumbaugh, Graves, Donohue & Raymond

[57] ABSTRACT

Methods and apparatus are disclosed for locating electronic price tags in an electronic pricing system for use in retail environments. A host communicates with tags via a serial data bus, with identifier or switch chips geographically located within the system, each identifier or switch chip mediating communications between the host and a subset of the tags. By particular messages exchanged between tags and identifiers or switches, and by particular messages exchanged between identifiers or switches and the host, the host is able to confirm the geographic location of a particular tag.

63 Claims, 4 Drawing Sheets

ELECTRONIC TAG LOCATION SYSTEMS

BACKGROUND OF THE INVENTION

Much attention has been given in recent years to systems for use in retail environments to show the prices of items of merchandise. While the historically common way of marking prices is manual marking at the location of goods, or on the goods themselves, some recent systems have attempted to use electronic means to provide prices at the location of goods. Especially in food retailing, such systems offer the prospect of a highly reliable relationship between the price shown at the location of the goods and the price charged, for example, at a bar code scanning cash register at the checkout counter.

Some electronic pricing systems have been shown to function at least in testing environments. Typically such systems have one or more data buses whereby a central computer communicates with one or more price tags among many thousands of price tags. Each price tag, also sometimes called a module or a label, has a display, typically a liquid crystal display. The tags are snapped into place on rails, each store shelf having a rail. Each rail has several conductors running along its length, so that a tag may be placed at almost any arbitrary location along a rail. The rails are tied together and communicate with a processor. In one known experimental system the rails do not communicate directly with the processor but are grouped according to gondola location within a store. Each gondola has a so-called controller connected with the rails of the gondola, and the controllers communicate directly with the processor.

In food retailing experience has shown that the physical placement of products within a store has enormous influence on the sales of the products. Such factors as shelf height for a product, and the number of product facings along a shelf, can be of great importance to store planners. A "plan-o-gram" is a plan showing product locations on shelves, typically in a chain of food retailers, and it is important that the plan-o-gram be faithfully followed in the individual store. A variety of factors, ranging from accident to intentional actions by store personnel or others, can give rise to deviations from the plan-o- gram.

Most present-day electronic pricing systems have the problem that one position on a rail is electrically and functionally indistinguishable, from the point of view of the processor and/or controller, from any of hundreds or thousands of other rail locations. This means, for example, that if a tag were to become separated from a rail (whether due to intentional removal or accident) if the tag were replaced in any of hundreds or thousands of other locations, the processor and/or controller would be unable to detect the misplacement. In a system with distinct gondola controllers, as described above, the system can at best can detect misplacement only if the tag has strayed so far as to be on a rail served by another controller. But misplacement to a different location on any of the many rails served by the same controller will be undetectable.

One approach to this need is to increase the number of controllers in the system. Such an increase would decrease the ratio of tags to controllers. But known controllers have high parts counts, are big, are costly, and add a lot to the total system cost.

There is thus a need for systems that permit detection of tag position with much greater resolution than heretofore available, thus permitting detection of misplaced tags. There is a need for such systems with parts counts that are not appreciably worse (higher) than the present systems. There is a need for such systems with physical bulk not appreciably greater than the present systems. Finally, there is a need for such systems to cost only moderately more than present systems.

SUMMARY OF THE INVENTION

Methods and apparatus are disclosed for locating electronic price tags in an electronic pricing system for use in retail environments. A host communicates with tags via a serial data bus, with identifier or switch chips geographically located within the system, each identifier or switch chip mediating communications between the host and a subset of the tags. In one embodiment, each switch selectively connects or disconnects a portion of the corresponding extension of the bus, thus permitting or denying communications between the tags on that extension and the host. In a second embodiment, each identifier is capable of sending messages via a portion of a corresponding bus extension to tags connected to that bus extension. In a third embodiment, each identifier is capable of sending messages via a portion of a corresponding bus extension to tags connected to that bus extension. In a fourth embodiment, each bus extension has a data line the voltage level of which generally tracks that of the data line of the bus, but which is isolatable from the data line of the bus by a diode or resistor. Individual tags of a given bus extension are able to exchange messages among themselves even when the host holds the data line of the bus at a constant voltage. By particular messages exchanged between tags and identifiers or switches, and by particular messages exchanged between identifiers or switches and the host, the host is able to confirm the geographic location of a particular tag. The identifiers and switches are comparable in size, cost, and complexity to the tags, so do not adversely impact overall system size, cost, or complexity.

BRIEF DESCRIPTION OF THE DRAWINGS

Exemplary embodiments of the invention are described with reference to drawings, of which.

Throughout the figures, like elements have been indicated where possible with like reference numerals.

DETAILED DESCRIPTION OF THE EMBODIMENTS

Figure 1:
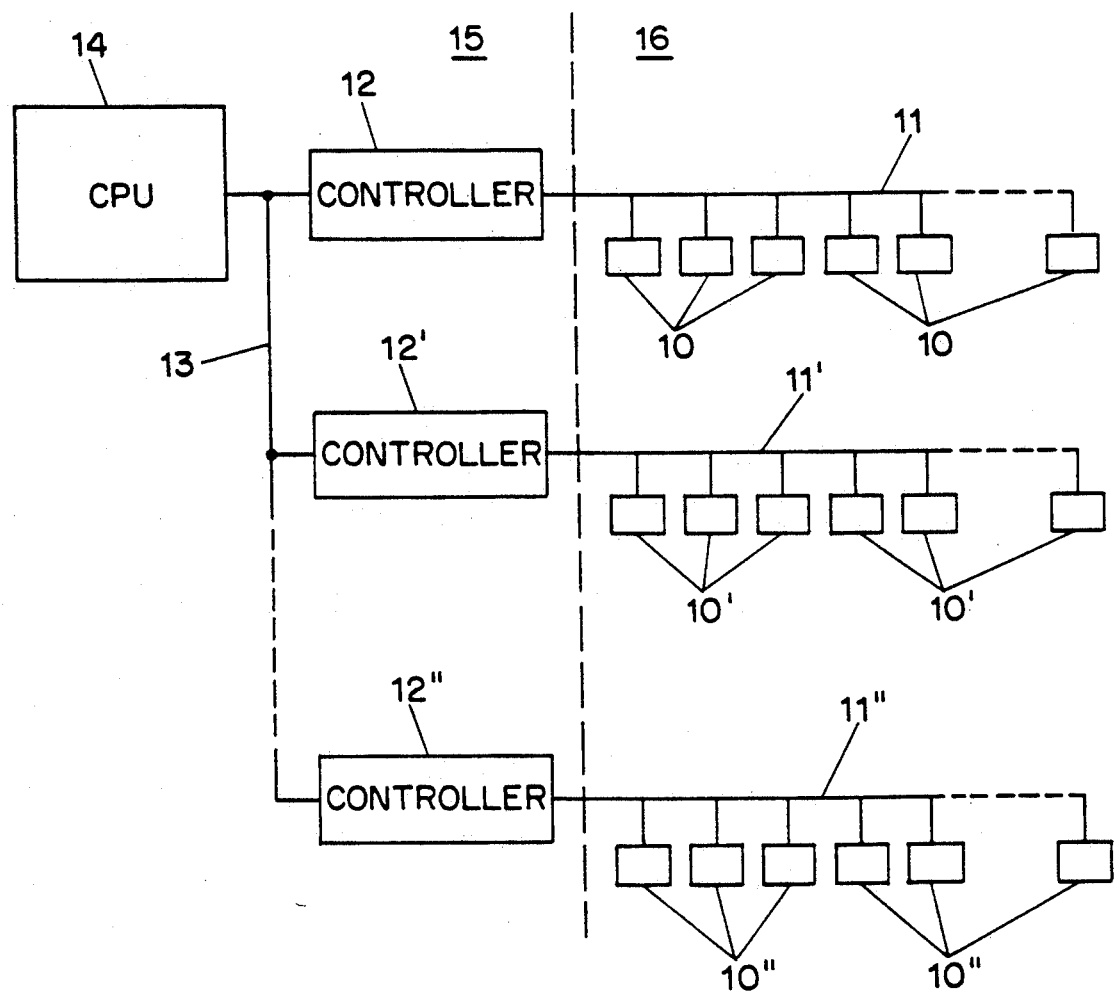
FIG. 1 is a functional block diagram of an electronic pricing system, showing processor, controllers, buses, and price tags.

In FIG. 1 is shown an electronic pricing system. Tags 10, 10', and 10" are visible to customers, each having a liquid- crystal display showing the price for the goods nearby to the tag. The tags 10 are all located on a bus 11, which typically runs to all shelves of a gondola. Shelf rails attached to the shelves contain bus conductors and provide a secure mechanical and electrical connection point for the tags. In one known experimental system, each bus 11, 11', 11" is connected to a corresponding controller 12, 12', 12". The controllers communicate via line 13 with a central processing unit (CPU) 14, here called a processor. Line 13 may be a metallic line or may be an RF link. Although only three controllers 12, 12', and 12" are shown, typically there are as many controllers as there are gondolas in the store. Although only six tags 10 are shown, typically there are many hundreds or thousands of tags 10 located on a bus of a given controller 12. A retail food store may have several tens of thousands of tags overall.

The controllers 12, 12', 12" receive all messages from the CPU 14. If a given controller 12 receives a message within its assigned portion of the address space of the link 13, and if the message is of the type intended ultimately to reach a tag 10, then the controller makes up a second message containing an address within the address space of the bus 11, the address based on information in the message from the link 13, and the second message is transmitted on the bus 11 for eventual reception by one of the individually addressable tags 10. The controllers 12, 12', 12" provide address conversion as well as a capability of storing and forwarding the data portions of the messages. Each controller has a microprocessor, RAM, ROM, and line drivers and receivers to interface with both the line 13 and the bus 11.

Each of the tags 10 contains a microprocessor that runs a stored program, preferably written in the assembly language of the microprocessor. The tag 10 receives power and ground from the lines 23, 25 to maintain microprocessor and display function. A backup battery may or may not be provided within the tag 10, and nonvolatile memory may or may not be provided within the tag 10. The microprocessor is chosen from the set of inexpensive microprocessors having built-in RAM and ROM so as to minimize the parts count inside the tag. Programming in each tag permits the tag to receive a bitstream from the data line. Preferably the bit stream is received in its entirety, and a checksum is evaluated. If the checksum is successful the bit stream, which preferably contains both address and data, is inspected to see if the address is one to which the tag is to respond. If so, then the data are received and acted upon accordingly, such as to update the displayed price. Some data items are in the nature of commands to the tag, asking the tag to respond on the bus in some predefined way such as to acknowledge receipt of a message, to provide the contents of internal registers or memories, or to confirm proper function.

As described above one architecture has a controller 12, 12', 12" located on each gondola. Another architecture can have a single device, here generically called a host, filling the role of the CPU 14 and the controller or controllers 12, 12', 12"". In exemplary embodiments discussed below, one choice is for the controller to be a central processor and a serial interface. The improvements described in detail below offer their advantages with either of the architectures just mentioned. Thus as shown in FIG. 1, the retail store setting may be functionally partitioned into a tag area 16 and a processor/controller or host area 15. For the discussion that follows the single device or host in the processor/controller area 15, or the discrete CPU and controllers in that area 15, will be collectively termed a host.

Figure 2:
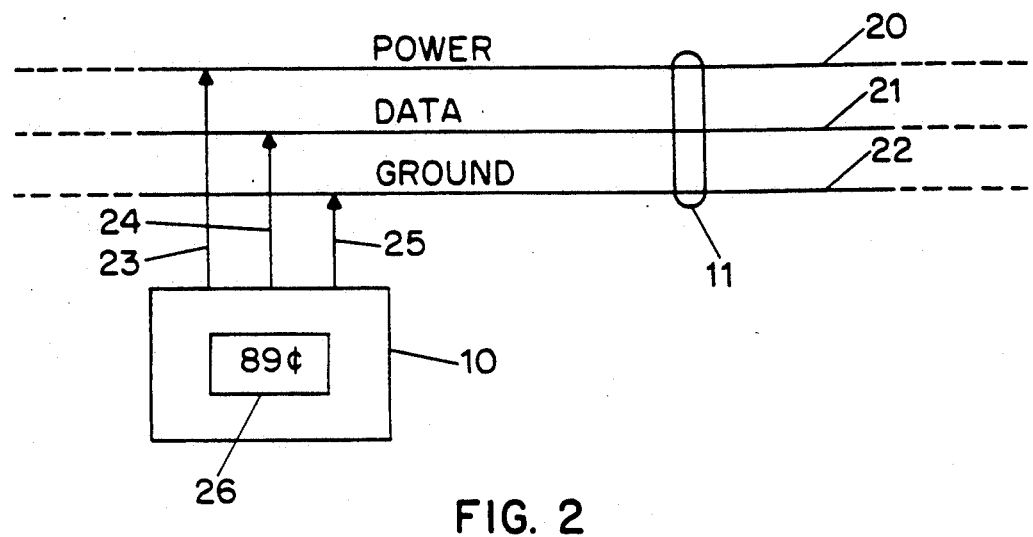
FIG. 2 is a diagram showing the structure of a bus such as that of FIG. 1.

FIG. 2 shows a known bus 11 and hardware of a known tag 10 in greater detail. Power, data, and ground lines 20, 21, and 22 respectively run along the entire path of the bus 11 (e.g. to all tag locations in a given gondola), and spring-loaded contacts 23, 24, and 25 on the label permit contact therewith. The power, data, and ground lines 20, 21, and 22 are typically conductors running in parallel along the length of the shelf rails, so that electrically and mechanically any point on a rail is indistinguishable from any other point on the rail. Display 26 permits the tag to display a price. Only one tag appears in FIG. 2 but typically the abovementioned many hundreds or thousands of tags 10 are located on a bus 11.

Figure 3:
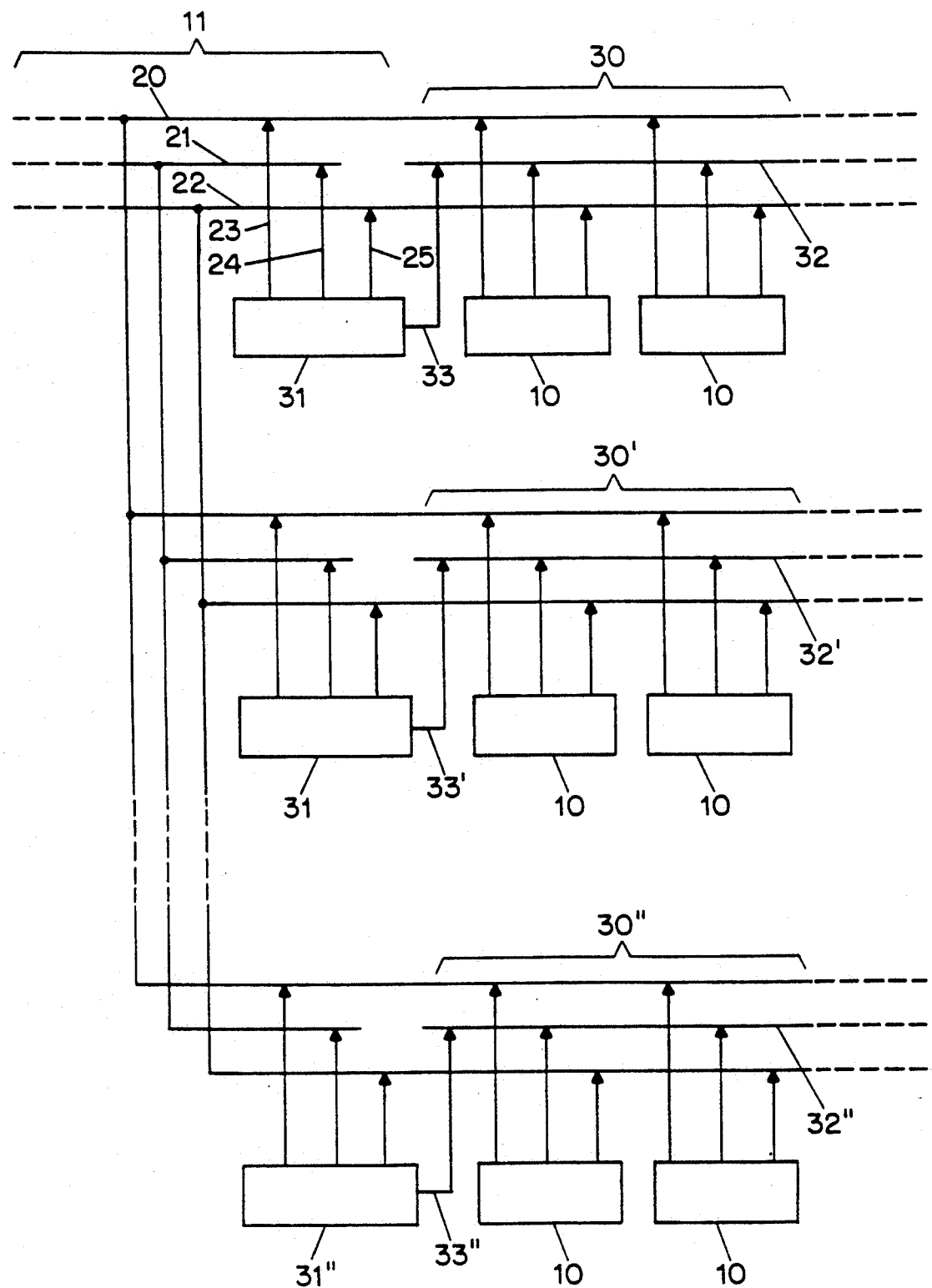
FIG. 3 is a diagram showing the structure of buses according to a first embodiment of the invention, including switches and price tags.

In a first embodiment of the invention as shown in FIG. 3, the bus 11 is seen at the left, with the previously mentioned power, data, and ground lines 20, 21, and 22 respectively. Bus extension 30 is shown, which has a first portion of power and ground lines electrically connected with those of the bus 11. A second portion, line 32, carries data under circumstances described below. Switch 31 (or 31' or 31") has four spring-loaded contacts, three of which contact the power, data, and ground lines of the bus 11 and one of which, contact 33, contacts line 32. The switch 31 preferably has nearly identical internal layout and parts list as a label 10, including the same microprocessor. A reed relay in switch 31 provides the a controllable connection between the lines 21 and 32, namely between contacts 24 and 33 of the switch 31. Reed relays are desirable because of the small inline voltage drop and small size. Bidirectional solid-state switches could also be used.

Each switch 31 has a unique address in the address space of bus 11. Among the defined messages capable of being sent along bus 11 to a switch 31 are a message to energize the reed relay and a message to deenergize the reed relay. To communicate with a particular label 10 it is necessary first to send a message to the associated switch 31 to energize the reed relay thus connecting the line 32 with the line 21, those lines being termed the "second portion" of the respective buses. Then it is necessary to send a message addressed to the particular label 10.

The system of this embodiment offers numerous advantages over other systems. At little additional bulk or cost or increase in complexity, it is possible to narrow down the location of a given tag 10 to within the geographical space of a particular switch 31. In a preferred embodiment there could be a switch 31 for each four-foot section of shelf rail, thus pinpointing a label's location to a particular shelf and to within four feet. The switches 31 could be mounted within the shelf rails at time of manufacture. In another embodiment there could be a switch 31 for each four-foot-wide vertical expanse of shelves, permitting narrowing down a tag location to within that expanse of shelves.

One possible failure mode for a label 10 is that it makes bus communication impossible, such as by responding on the bus at incorrect times. In the system of this embodiment such a failure may be remedied by the simple expedient of opening the reed relay of the associated switch 31. The localized control of the switches 31 permits troubleshooting of rails and tags so that repair personnel may go directly to the offending part rather than having to search all rails for, say, a shorted data line.

Figure 4:
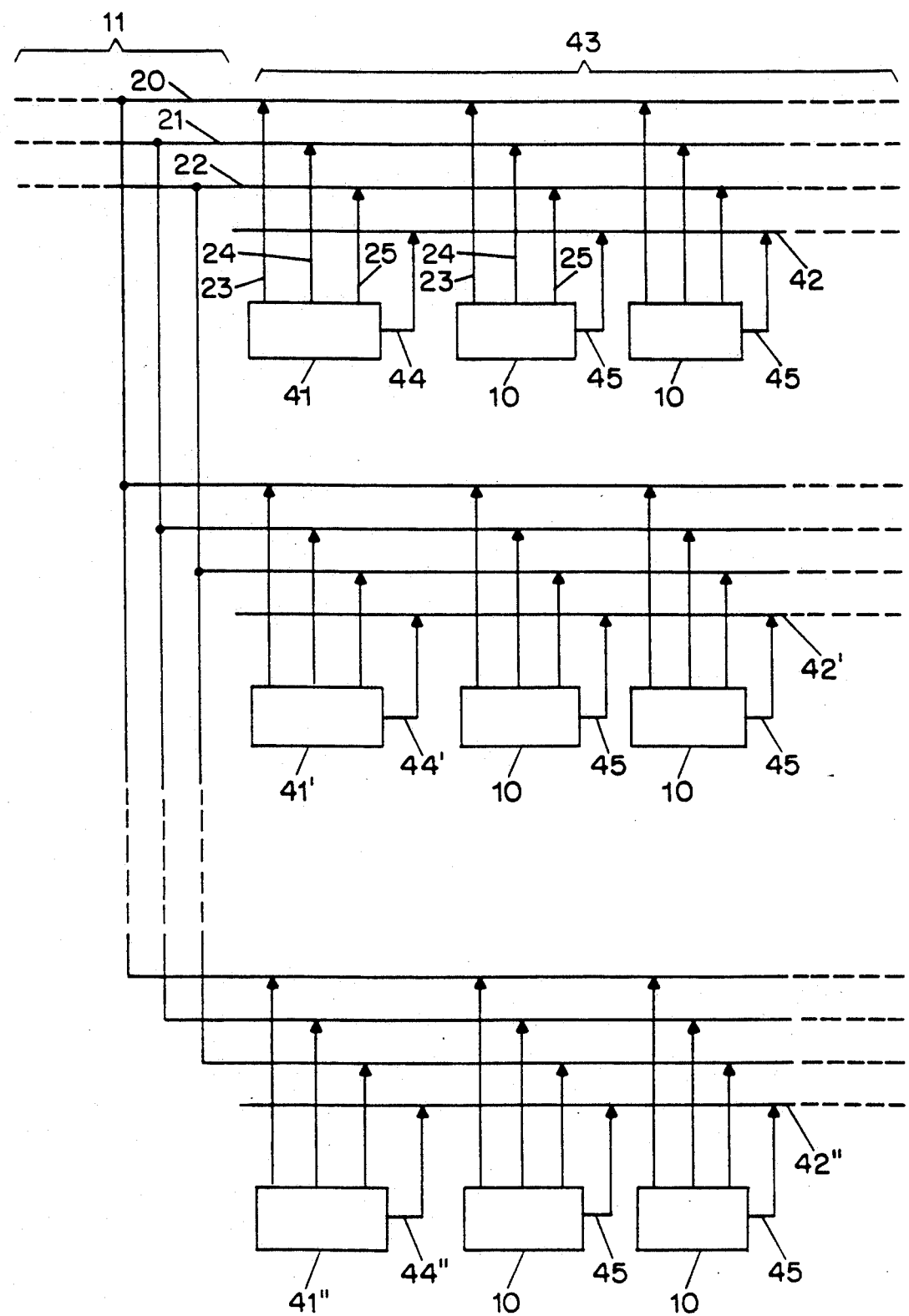
FIG. 4 is a diagram showing the structure of buses according to second and third embodiments of the invention, including switches and price tags.

Second and third embodiments of the invention are shown in FIG. 4. Bus 11 with power, data, and ground lines 20, 21, and 22 is distributed to all labels 10 by bus extensions 43. Each of the labels 10 has spring-loaded contacts as in the systems of FIGS. 3 and 2 for connection with the power, data, and ground lines 20, 21, and 22.

Bus extensions 43 carry not only the signals of bus 11, here called a first portion of bus extensions 43, but also carry an additional line 42, 42', 42", here called a second portion of bus extensions 43. Messages on the line 42 are here termed "extension messages" in distinction from the messages on the data line 21, here termed "bus messages".

Located at an arbitrary physical location along a particular bus extension 43 is an identifier 41 (or 41", or 41"). Thus, while FIG. 4 shows the identifier 41 at the connection point between bus 11 and bus extension 43, the identifier could be at the other end of the bus extension 43 or anywhere between the two ends.

Each identifier 41 has three contacts 23, 24, and 25 corresponding to those of switch 31 (in FIG. 3) and tag 10 (in FIGS. 2 and 3). Each identifier 41 also has a fourth contact 44 (or 44', or 44") which is in contact with line 42. Each tag 10 likewise has three contacts 23, 24, and 25 corresponding to those of tag 10 in FIGS. 2 and 3. Each tag 10 also has a fourth contact 45 which is in contact with line 42.

In a second embodiment of the invention, the hardware configuration of FIG. 4 is employed. Identifiers 41 are capable of sending messages via contacts 44 to lines 42. Each of the tags 10 connected with a given bus extension 43 is able to receive the messages from the line 42 of the bus extension 43. Each such tag is able to receive information from the line 42 by its input contact 45.

In the simple case the messages carried on line 42 ("extension messages") are no more than a logic level. A message sent by the host to a particular identifier 41 causes the identifier 41 to pull low the normally open or high line 42. Another message sent by the host asks a particular tag 10 whether it sees the line 42 to be low. The message sent in response by the tag 10 tells the host whether or not the tag 10 is connected to the particular identifier 41 that was addressed. This permits the host to readily confirm the correct location of a tag 10, and to detect misplacement of the tag 10 if it has strayed to an area not connected with the expected particular identifier 41.

while the tags 10, switches 31, and identifiers 41 have heretofore been discussed in connection with their ability to be individually addressed with unique addresses in the address space of the bus 11, it is useful also to define a particular address, such as the address of all zeros, as a "global" address. Such an address is decoded and acted upon by all devices in a given category (i.e. tags, switches, or identifiers). Thus in the case of the embodiment just described, the occasional circumstance could arise in which it is helpful to be able to ask all identifiers 41 to pull low their respective lines 42. In principle any tag 10, if asked about the status of its line 42, should report that the line 42 is low. Any other result requires further troubleshooting, such as a search for a nonfunctioning identifier 41.

In a variation on the second embodiment, a predetermined message to a particular identifier 41 prompts it to transmit a message via line 42 to all tags 10 on that line, the message (again called an "extension message") preferably consisting of the unique address of the identifier 41. Each tag 10 has a memory capable of storing the message. Among the permissible commands from the host to a tag 10 is a request that the tag 10 provide the message, if any, that was received from line 42. By this means the host is able to confirm the location of the tag based on the known physical location of the identifier 41.

The identifiers 41, like the switches 31, have a parts count, cost, and size comparable to that of the tags 10. This is in contrast to present day gondola controllers which are more than ten times heavier, expensive, and bulky.

In the above-described variation on the second embodiment, a global command to the identifiers 41 could prompt all of them to transmit their messages to the labels 10, followed by individual pollings of the labels 10 for the messages received by the labels on the lines 42.

In a third embodiment of the invention, the hardware configuration of FIG. 4 is employed, just as in the second embodiment discussed above. What differs between the second and third embodiments is that identifiers 41 are capable of receiving messages via contacts 44 from lines 42. Each of the tags 10 connected with a given bus extension 43 is able to send messages to the line 42 of the bus extension 43. Each such tag is able to send information from the line 42 by its output contact 45.

As with the second embodiment, in the simple case the messages carried on line 42 are no more than a logic level. A message sent by the host to a particular label 10 causes the label 10 to pull low the normally open or high line 42. The identifier 41 then transmits, by its line 21, a message to the host. Preferably the message sent (a "bus message") is the unique address of the particular identifier 41. The bus message sent in response by the identifier 41 tells the host whether or not the tag 10 is connected to the particular identifier 41 that was expected. This permits the host readily to confirm the correct location of a tag 10, and to detect misplacement of the tag 10 if it has strayed to an area not connected with the expected particular identifier 41.

The identifiers 41 in the third embodiment, like the identifiers 41 of the second embodiment, have a parts count, cost, and size comparable to that of the tags 10.

Figure 5:
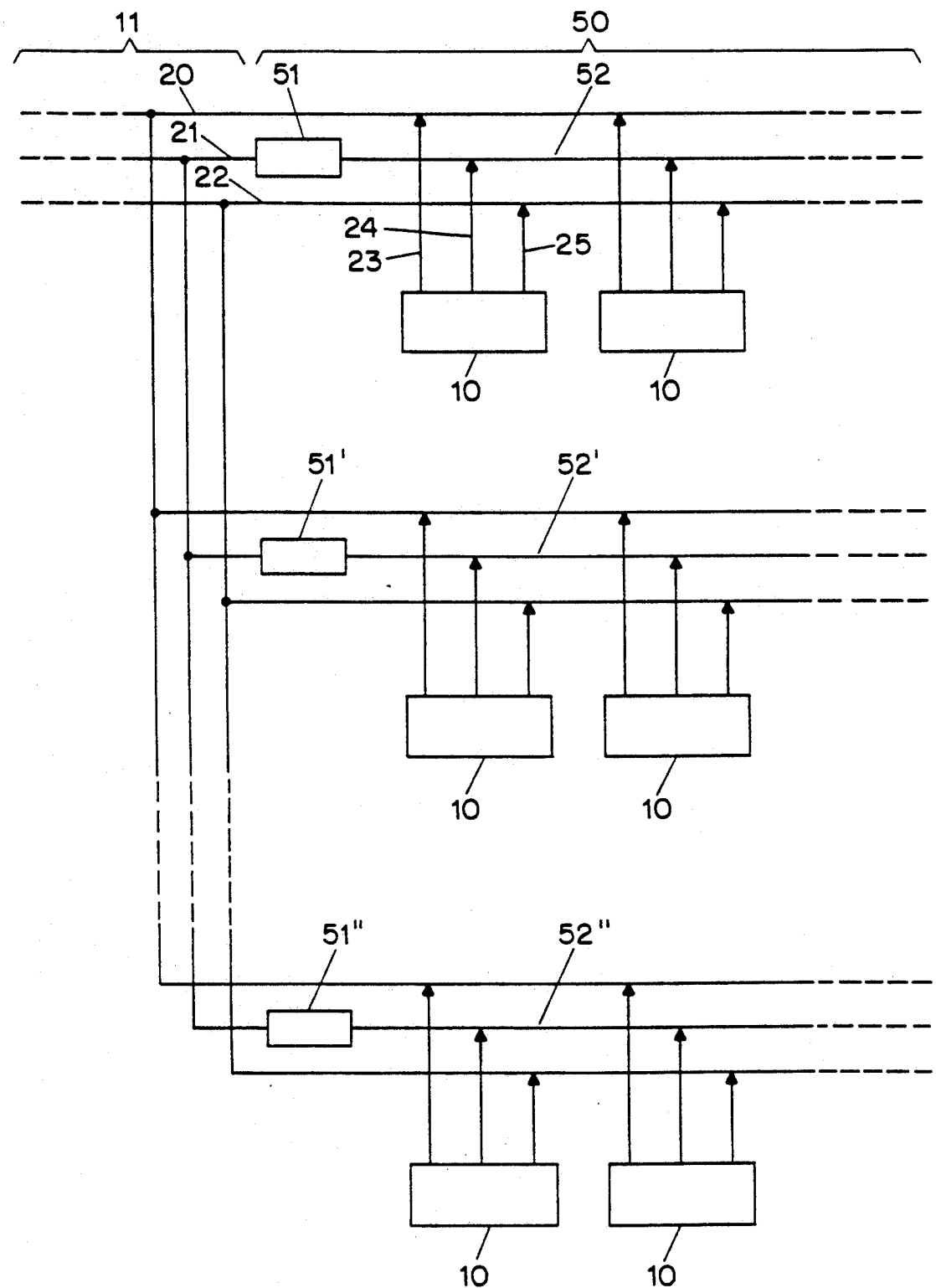
FIG. 5 is a diagram showing the structure of buses according to a fourth embodiment of the invention, including an isolator.

In a fourth embodiment of the invention, the hardware configuration of FIG. 5 is employed. Isolators 51 are capable of coupling line 21 of the bus with lines 52, 52', and 52". Each of the tags 10 connected with a given bus extension 50 is able to receive the messages from the line 52 of the bus extension 50. Each such tag is able to receive information from the line 52 by its input/output contact 24. Isolator 51 is preferably a resistor or a constant-current diode. Its component ratings, as well as the data line impedance and the data-line driving capability of the host and the tags, are all selected to satisfy several constraints. In normal conditions the host driver driving data line 21 supplies data values to the line 21 that are available via the lines 52, 52', 52" to all the tags 10, each by its respective input line 24. Likewise in normal conditions the data driver in each tag 10 is able to drive the corresponding data line 52, 52', 52" with the data values received by the host on line 21.

The out-of-normal condition arises when it is desired to confirm the location of a tag. The host sends a message to a particular tag 10 requesting that the tag send a locator message. Next, the host holds the data line 21 at a particular voltage, for a predetermined interval of time. Under control of its stored program, the particular tag 10 broadcasts a locator message by its input/output pin 24 on its line 52, 52', 52", and does so during the predetermined interval of time. Because the data line 21 is being held at a particular voltage, the message broadcast by the particular tag 10 is not detectable on the line 21, nor on any of the lines 52, 52', 52" other than the line of the bus extension of the particular tag. It may thus be said that only the "neighbors" (tags on the same bus extension) of the particular tag are able to receive the locator message. Each tag has an internal latch, also called a status flag, indicative of having received the locator message.

Under program control, the predetermined interval having elapsed, the host tristates the line 21 permitting it to be driven by any device on the data lines 21, 52, 52', 52". The host subsequently sends messages to one or another of the tags that, according to existing records, is thought to be present on the bus extension. Each such tag (a "candidate neighbor") is asked whether it received the locator message. In general it is expected that most responses from a candidate tag to the host would be in the affirmative. But if a tag has been moved the message may then be in the negative. When a tag confirms having received the locator message it clears the internal status flag indicative of having received the locator message.

It will be appreciated that a single such negative response does not permit determination by the host as to whether it is the particular tag or the candidate neighbor that got moved from the expected position. It will also be appreciated, however, that once the remaining candidate tags for a given bus extension have been likewise interrogated it will be clear whether the explanation is the particular tag having been moved or a candidate tag having been moved.

As mentioned above after asking a particular tag to broadcast its locator message, all the candidate neighbors will be polled to confirm their proper location on the same bus extension of the particular tag. The question remains whether some spurious tag is present on the bus extension in addition to the expected tags. To detect this condition the host will broadcast a global message asking all tags whether there is any tag that received the locator message and has not yet been cleared by the above-mentioned polling. As mentioned above, the addressing system for tags preferably has a global address defined to which all tags will respond. If any tag satisfies this condition it is probably on the particular bus extension but should not be there.

In the simple case the locator messages carried on line 52 are no more than a logic level. A message sent by the host to a particular tag 10 causes the tag 10 to pull low the line 52 at a time when the line 21 is being held high by the host. A later message sent by the host asks a second tag 10 whether it saw the line 52 to be low. The message sent in response by the second tag 10 tells the host whether or not the tag 10 is connected to the particular tag 10 that was asked to send the locator message. This permits the host to readily confirm the correct location of a second tag 10, and to detect misplacement of the second tag 10 if it has strayed to an area not connected with the expected particular first tag 10.

In a more complicated arrangement the locator message carried on line 52 contains the address of the particular tag 10 that transmitted the locator message. The second tag 10, assuming it received the locator message, stores the address and makes it available to the host if polled by the host.

With any of the four embodiments, then, it is possible first to confirm the correct location of a given tag and second, to use a global message to find out if any spurious tags are located in a given area.

In a given retail store system it is expected that the updating of tag contents will require less than all of the bus time available. Thus some bus time will be free for housekeeping tasks such as the above-described checks to confirm the proper location of tags in stores. If one or more tags have been removed and replaced, thus located on incorrect bus extensions, this will be detectable by the host and can be annunciated appropriately. A message could be made available to store personnel prompting locating the offending tag and replacing it to its proper location. A message could be made available by modem to a central control location for multiple stores in a retail chain.

While specific preferred embodiments have been described, they are merely exemplary and those skilled in the art will perceive numerous modifications and variations of the embodiments without departure from the spirit and scope of the invention, as defined by the appended claims.

We claim:
1. An electronic price tag system comprising:
   a bus having a first portion and a second portion;
   a host operatively connected with the bus for sending and receiving bus messages on the bus;
   a plurality of bus extensions each having a first portion and a second portion, the first portion of each of the bus extensions operatively connected with the first portion of the bus;
   a plurality of switches operatively connected with the bus, each corresponding with a particular one of the bus extensions, each switch selectively connecting the second portion of the bus with the second portion of the corresponding bus extension; and
   a multiplicity of tags, a plurality of which are operatively connected with each of the bus extensions, each tag having a display for displaying price information, each tag having a data driver for sending bus messages to the host and receiving bus messages from the host only when the switch corresponding to the bus extension connected to the tag connects the second portion of the bus with the second portion of the bus extension.

2. The system of claim 1 wherein the bus is a serial asynchronous bus, the first portion of the bus comprises power and ground lines, and the second portion of the bus comprises a data line.

3. The system of claim 2 wherein each switch has a distinct address in the address space of the host, each switch responding to corresponding bus messages from the host for connecting and disconnecting the second portion of the bus with the second portion of the corresponding bus extension.

4. The system of claim 3 wherein each switch is associated with a particular geographic area in a retail store.

5. The system of claim 4 wherein some of the particular geographic areas are shelves holding merchandise.

6. The system of claim 1 wherein each switch is associated with a particular geographic area in a retail store.

7. The system of claim 6 wherein some of the particular geographic areas are shelves holding merchandise.

8. The system of claim 1 wherein the host comprises a personal computer and a serial interface.

9. A method for communicating with a particular tag in an electronic price tag system, the system having a bus having a first portion and a second portion; a host operatively connected with the bus for sending and receiving bus messages on the bus; a plurality of bus extensions each having a first portion and a second portion, the first portion of each of the bus extensions operatively connected with the first portion of the bus; a plurality of switches operatively connected with the bus, each corresponding with a particular one of the bus extensions, each switch selectively connecting the second portion of the bus with the second portion of the corresponding bus extension; and a multiplicity of tags, a plurality of which are operatively connected with each of the bus extensions, each tag capable of sending bus messages to the host and receiving bus messages from the host only when the switch corresponding to the bus extension connected to the tag connects the second portion of the bus with the second portion of the bus extension; said method comprising:

sending a bus message from the host to the switch corresponding with the bus extension connected with the particular tag causing the switch to connect the second portion of the bus with the second portion of the corresponding bus extension; and communicating with the particular tag.

10. The method of claim 9 wherein the communicating with the particular tag comprises sending a bus message to the tag.

11. The method of claim 10 wherein the bus message comprises a request that the tag change the price in the display of the tag.

12. The method of claim 9 wherein the communicating with the particular tag comprises receiving a bus message from the tag.

13. An electronic price tag system comprising:
a bus;
a host operatively connected with the bus for sending and receiving bus messages on the bus;
a plurality of bus extensions each having a first portion and a second portion, the first portion of each of the bus extensions operatively connected with the first portion of the bus;
a plurality of identifiers operatively connected with the bus, each corresponding with a particular one of the bus extensions, each identifier operatively connected with the second portion of the corresponding bus extension, each identifier capable of receiving bus messages from the host on the bus, each identifier capable of sending extension messages on the second portion of its corresponding bus extension; and
a multiplicity of tags, a plurality of which operatively connected with each of the bus extensions, each tag having a display for displaying price information, each tag capable of sending bus messages to the host and receiving bus messages from the host, each tag capable of receiving extension messages from the identifier corresponding to the bus extension connected to the tag, said extension messages communicated by the second portion of the bus extension connected to the tag.

14. The system of claim 13 wherein the bus is a serial asynchronous bus, the first portion of the bus comprises power, ground, and first data lines, and the second portion of the bus comprises a second data line.

15. The system of claim 14 wherein each identifier is associated with a particular geographic area in a retail store.

16. The system of claim 15 wherein some of the particular geographic areas are shelves holding merchandise.

17. The system of claim 13 wherein each identifier is associated with a particular geographic area in a retail store.

18. The system of claim 17 wherein some of the particular geographic areas are shelves holding merchandise.

19. The system of claim 13 wherein the host comprises a personal computer and a serial interface.

20. The system of claim 13 wherein each identifier has a unique address in the address space of the bus, and each identifier responds to a predetermined bus message from the host by sending a corresponding predetermined extension message by the second portion of the bus extension corresponding thereto.

21. The system of claim 20 wherein sending the corresponding predetermined extension message comprises sending information indicative of the unique address of the identifier on the second portion of the bus extension corresponding thereto.

22. The system of claim 20 wherein sending the corresponding predetermined extension message comprises changing the state of a line of the second portion of the bus extension corresponding to the identifier.

23. The system of claim 22 wherein changing the state of a line of the second portion of the bus extension corresponding to the identifier comprises grounding the line.

24. The system of claim 21 wherein each tag further comprises a memory for storing information indicative of the unique address of the identifier received on the second portion of the bus extension corresponding thereto, each tag responsive to a predetermined bus message from the host to send a bus message to the host including the stored information.

25. The system of claim 22 wherein each tag further comprises a memory for storing information indicative of the change of the state of the line of the second portion of the bus extension corresponding thereto, each tag responsive to a predetermined bus message from the host to send a bus message to the host including the stored information.

26. A method for confirming the location of a particular tag in an electronic price tag system comprising a bus; a host operatively connected with the bus for sending and receiving bus messages on the bus; a plurality of bus extensions each having a first portion and a second portion, the first portion of each of the bus extensions operatively connected with the first portion of the bus; a plurality of identifiers operatively connected with the bus, each corresponding with a particular one of the bus extensions, each identifier operatively connected with the second portion of the corresponding bus extension, each identifier capable of receiving bus messages from the host on the bus, each identifier capable of sending extension messages on the second portion of its corresponding bus extension; each identifier having a unique address in the address space of the bus, each identifier responding to a predetermined bus message from the host by sending a corresponding predetermined extension message by the second portion of the bus extension corresponding thereto; and a multiplicity of tags, a plurality of which are operatively connected with each of the bus extensions, each tag having a display for displaying price information, each tag capable of sending bus messages to the host and receiving bus messages from the host, each tag capable of receiving extension messages from the identifier corresponding to the bus extension connected to the tag, said extension messages communicated by the second portion of the bus extension connected to the tag, each tag having a memory storing information indicative of an extension message received on the second portion of the bus extension connected to the tag, each tag responding to a predetermined bus message for sending a bus message to the host including the stored information, said method comprising:

sending a first bus message to an identifier on the bus;
    sending a corresponding predetermined extension message on the second portion of the bus extension corresponding to the identifier;
    sending a second bus message to the particular tag requesting a response from the tag including the stored information;
    sending a third bus message from the particular tag including the stored information;
    whereby the stored information is confirmatory of the location of the tag.

27. The method of claim 26 wherein sending the corresponding predetermined extension message comprises sending information indicative of the unique address of the identifier on the second portion of the bus extension corresponding thereto.

28. The method of claim 26 wherein sending the corresponding predetermined extension message comprises changing the state of a line of the second portion of the bus extension corresponding to the identifier.

29. The method of claim 28 wherein changing the state of a line of the second portion of the bus extension corresponding to the identifier comprises grounding the line.

30. An electronic price tag system comprising:
    a bus;
    a host operatively connected with the bus for sending and receiving bus messages on the bus;
    a plurality of bus extensions each having a first portion and a second portion, the first portion of each of the bus extensions operatively connected with the first portion of the bus;
    a plurality of identifiers operatively connected with the bus, each corresponding with a particular one of the bus extensions, each identifier operatively connected with the second portion of the corresponding bus extension, each identifier capable of sending bus messages to the host on the bus, each identifier capable of receiving extension messages on the second portion of its corresponding bus extension; and
    a multiplicity of tags, a plurality of which are operatively connected with each of the bus extensions, each tag having a display for displaying price information, each tag having a unique address in the address space of the bus, each tag capable of sending bus messages to the host and receiving bus messages from the host, each tag capable of sending extension messages to the identifier corresponding to the bus extension connected to the tag, said bus messages communicated by the second portion of the bus extension connected to the tag.

31. The system of claim 30 wherein the bus is a serial asynchronous bus, the first portion of the bus comprises power, ground, and first data lines, and the second portion of the bus comprises a second data line.

32. The system of claim 30 wherein each bus extension is associated with a particular geographic area in a retail store.

33. The system of claim 32 wherein some of the particular geographic areas are shelves holding merchandise.

34. The system of claim 30 wherein each bus extension is associated with a particular geographic area in a retail store.

35. The system of claim 34 wherein some of the particular geographic areas are shelves holding merchandise.

36. The system of claim 30 wherein the host comprises a personal computer and a serial interface.

37. The system of claim 30 wherein each identifier has a unique address in the address space of the bus, and each identifier responds to a predetermined extension message on the second portion of the bus extension corresponding thereto by sending a corresponding predetermined bus message by the bus to the host.

38. The system of claim 37 wherein the predetermined extension bus message comprises information indicative of the unique address of a tag on the bus.

39. The system of claim 37 wherein the predetermined extension message comprises a change in the state of a line of the second portion of the bus extension corresponding to the identifier.

40. The system of claim 39 wherein the change in the state of a line of the second portion of the bus extension corresponding to the identifier comprises grounding the line.

41. The system of claim 38 wherein each identifier further comprises a memory for storing information indicative of the unique address of the tag received on the second portion of the bus extension corresponding thereto, each identifier responsive to a predetermined bus message from the host to send a bus message to the host including the stored information.

42. The system of claim 39 wherein each identifier further comprises a memory for storing information indicative of the change of the state of the line of the second portion of the bus extension corresponding thereto, each identifier responsive to a predetermined bus message from the host to send a bus message to the host including the stored information.

43. A method for confirming the location of a particular tag in an electronic price tag system comprising a bus; a host operatively connected with the bus for sending and receiving bus messages on the bus; a plurality of bus extensions each having a first portion and a second portion, the first portion of each of the bus extensions operatively connected with the first portion of the bus; a plurality of identifiers operatively connected with the bus, each corresponding with a particular one of the bus extensions, each identifier operatively connected with the second portion of the corresponding bus extension, each identifier capable of sending bus messages to the host on the bus, each identifier capable of receiving extension messages on the second portion of its corresponding bus extension; each identifier having unique address in the address space of the bus, each identifier responding to a predetermined extension message received at the second portion of the bus extension corresponding thereto by sending a corresponding predetermined bus message to the host; and a multiplicity of tags, a plurality of which are operatively connected with each of the bus extensions, each tag having a display for displaying price information, each tag having a unique address in the address space of the bus, each tag capable of sending bus messages to the host and receiving bus messages from the host, each tag capable of sending extension messages to the identifier corresponding to the bus extension connected to the tag, said extension messages communicated by the second portion of the bus extension connected to the tag, each identifier having a memory storing information indicative of an extension message received on the second portion of the bus extension connected to the identifier, each identifier responding to a predetermined extension message for sending a bus message to the host including the stored information, said method comprising:

sending a first bus message to a particular tag on the bus;

sending a corresponding predetermined extension message on the second portion of the bus extension connected to the particular tag;

sending a second bus message to the identifier corresponding to the bus extension connected to the particular tag requesting a response from the identifier including the stored information;

sending a third bus message from the identifier corresponding to the bus extension connected to the particular tag including the stored information;

whereby the stored information is confirmatory of the location of the tag.

44. The method of claim 43 wherein sending the corresponding predetermined extension message comprises sending information indicative of the unique address of the tag on the second portion of the bus extension connected thereto.

45. The method of claim 43 wherein sending the corresponding predetermined extension message comprises changing the state of a line of the second portion of the bus extension connected to the particular tag.

46. The method of claim 45 wherein changing the state of a line of the second portion of the bus extension connected to the tag comprises grounding the line.

47. The method of claim 43 wherein sending a bus message from the identifier corresponding to the bus extension connected to the particular tag including the stored information comprises sending information indicative of the unique address of the identifier.

48. The method of claim 46 wherein sending a bus message from the identifier corresponding to the bus extension connected to the particular tag including the stored information comprises sending information indicative of the unique address of the identifier.

49. An electronic price tag system comprising:

a bus;

a host operatively connected with the bus for sending and receiving bus messages on the bus and capable of holding a line of the bus at a fixed voltage level;

a plurality of bus extensions each having a first portion and a second portion, the first portion of each of the bus extensions operatively connected with the first portion of the bus;

a plurality of isolators operatively connected with the bus, each corresponding with a particular one of the bus extensions, each isolator operatively connected with the second portion of the corresponding bus extension, each isolator capable of inducing a voltage drop between a line of the bus and a line of its corresponding bus extension; and a multiplicity of tags, a plurality of which are operatively connected with each of the bus extensions, each tag having a display for displaying price information, each tag having a unique address in the address space of the bus, each tag capable of sending bus messages to the host and receiving bus messages from the host, each particular tag capable, when the host is holding a line cf the bus at a fixed voltage level, of sending extension messages to others of the tags connected with the bus extension to which the each particular tag is connected.

50. The system of claim 49 wherein the bus is a serial asynchronous bus, the first portion of the bus comprises power, ground, and first data lines, and the second portion of the bus comprises a second data line.

51. The system of claim 49 wherein each bus extension is associated with a particular geographic area in a retail store.

52. The system of claim 51 wherein some of the particular geographic areas are shelves holding merchandise.

53. The system of claim 49 Wherein each bus extension is associated with a particular geographic area in a retail store.

54. The system of claim 53 wherein some of the particular geographic areas are shelves holding merchandise.

55. The system of claim 49 wherein the host comprises a personal computer and a serial interface.

56. The system of claim 49 wherein the isolator comprises a constant-current diode.

57. The system of claim 49 wherein the isolator comprises a resistor.

58. A method for confirming the location of a particular tag in an electronic price tag system comprising a bus; a host operatively connected with the bus for sending and receiving bus messages on the bus and capable of holding a line of the bus at a fixed voltage level; a plurality of bus extensions each having a first portion and a second portion, the first portion of each of the bus extensions operatively connected with the first portion of the bus; a plurality of isolators operatively connected with the bus, each corresponding with a particular one of the bus extensions, each isolator operatively connected with the second portion of the corresponding bus extension, each isolator capable of inducing a voltage drop between a line of the bus and a line of its corresponding bus extension; a multiplicity of tags, a plurality of which are operatively connected with each of the bus extensions, each tag having a display for displaying price information, each tag having a unique address in the address space of the bus, each tag capable of sending bus messages to the host and receiving bus messages from the host, each particular tag capable, when the host is holding a line of the bus at a fixed voltage level, cf sending extension messages to others of the tags connected with the bus extension to which the each particular tag is connected, said method comprising:

sending a first bus message to a particular tag on the bus;

holding a line of the bus at a fixed voltage level;

sending a corresponding predetermined extension message on the second portion of the bus extension connected to the particular tag;

discontinuing holding the line of the bus at a fixed voltage level;

sending a second bus message to a second tag connected to the bus extension connected to the particular tag requesting a response from the second tag;

sending a third bus message from the second tag to the host;

whereby the stored information is confirmatory of the location of the second tag.

59. The method of claim 58 wherein sending the corresponding predetermined extension message comprises sending information indicative of the unique address of the tag on the second portion of the bus extension connected thereto.

60. The method of claim 58 wherein sending the corresponding predetermined extension message comprises changing the state of a line of the second portion of the bus extension connected to the particular tag.

61. The method of claim 60 wherein changing the state of a line of the second portion of the bus extension connected to the tag comprises grounding the line.

62. The method of claim 59 wherein sending a bus message from the second tag comprises sending information indicative of the unique address of the particular tag.

63. The method of claim 59 wherein sending a bus message from the second tag comprises sending information indicative of the unique address of the second tag.

* * * * *